June 19, 1928.  B. COUCH  1,674,276

ANIMAL TRAP

Filed March 4, 1927

Inventor
Boel Couch
By Lynn H Latta
Attorney

Patented June 19, 1928.

1,674,276

UNITED STATES PATENT OFFICE.

BUEL COUCH, OF SIOUX CITY, IOWA.

ANIMAL TRAP.

Application filed March 4, 1927. Serial No. 172,626.

My invention relates to animal traps and it is my object to provide an animal trap of simple, durable, and inexpensive construction.

More particularly, it is my object to provide a trap, the jaws of which need move only a short distance to engage the animal to be trapped.

More particularly, my invention comprises a pair of elements slidably mounted relative to each other, each having a jaw projecting at right angles thereto, together with a trigger mounted between the jaws.

A still further object of my invention is to provide a trap in which the animal can not reach the trigger without being well exposed to the action of the jaws.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 4:
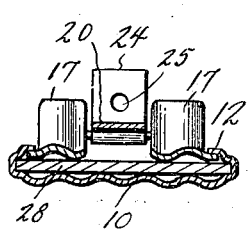
Fig. 4 is a transverse, sectional view taken on the line 4—4 of Fig. 3.

I have used the reference character 10 to indicate generally a base which is formed of corrugated metal as shown in Fig. 4. One end of the base 10 is bent upwardly to form the outer jaw 11. The side edges of the base 10 are curled inwardly to form the channels 12. Between the channels 12, the sliding element 13 is mounted. One end of the sliding element 13 is bent upwardly to form the inner jaw 14. A longitudinal slot 15 completely divides the element 13 into halves and the slot 15 is continued into the jaw 14 to form a trigger receiving opening 16. The jaw 14 serves to connect the two halves of the element 13. The rear ends of the halves of the element 13 are bent upwardly to form finger-engaging handles 17.

Figure 1:
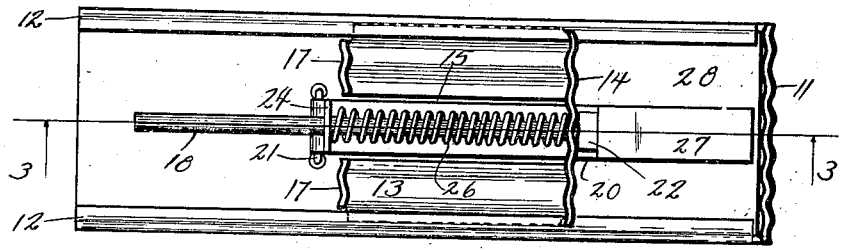
Fig. 1 is a plan view of the trap.
Figure 2:
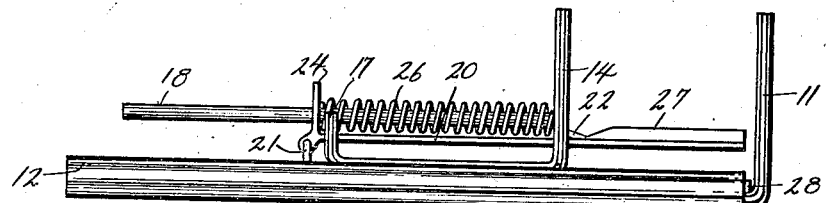
Fig. 2 is a side elevation of the trap.
Figure 3:
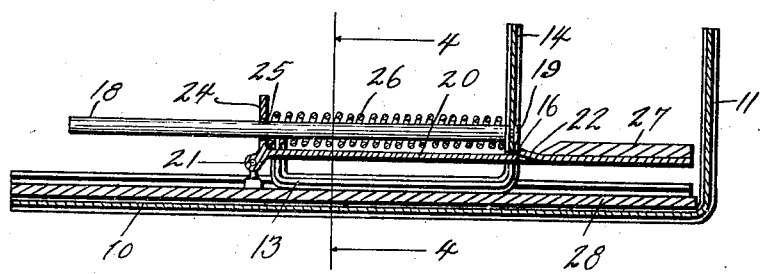
Fig. 3 is a longitudinal, sectional view of the trap, taken on the line 3—3 of Fig. 1.

A shaft 18 is swaged as at 19 into the jaw 14. A trigger 20 is pivoted at one end as at 21 to the base 10. The trigger 20 extends forwardly through the opening 16 and is provided with a trigger latch 22 adapted to engage the jaw 14 at the edge of the opening 16. (See Fig. 3). At its rear end, the trigger 20 is provided with a lever 24, forming, together with the trigger, a substantially bell-crank shaped lever. In the lever 24 is an opening 25 through which the shaft 18 slides. A spring 26 encircles the shaft 18 and is compressed between the lever 24 and the jaw 14.

It will now be seen that the pressure of the spring 26 will force the jaw 14 toward the jaw 11, the sliding element 13 sliding between the channels 12 of the base 10, when the trigger is depressed. At the same time, the spring 26 serves to urge the trigger upwardly against the upper extremity of the opening 16. The trap may be made any desired width and the jaws any desired height.

That portion of the trigger which is engaged by an animal is positioned at the center of the space between the jaws and it will be impossible for an animal to release the trigger without having a large portion of its body exposed to the jaws.

I find that it adds to the effectiveness of the trap to veneer the trigger and the base with wood or fibre. To this end, a slab of wood 27 may be secured to that portion of the trigger extending between the jaws and a thin sheet of wood 28 secured to the upper side of the base. The sheet of wood 28 further serves to give a better sliding surface for the element 13 and reduces friction.

An advantage of the trap lies in the fact that it may be placed before a mouse hole or the like in such a way as to form a channel-shaped exit thereto and to make it impossible for the animal to escape from the hole without passing between the jaws of the trap.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In an animal trap, a base, an outer jaw at one end of the base extending substantially at right angels thereto, a sliding member slidably mounted relative to the base, an inner jaw on the sliding member, positioned substantially parallel to the outer jaw, a trigger comprising an elongated arm, the free end of which extends through an opening in the inner jaw and to a position adjacent the outer jaw, the other end of said trigger being hinged above the base beyond the sliding member, the trigger having a latch element adapted to engage the upper extremity of said opening in the inner jaw and resilient means for moving the inner jaw toward the outer jaw.

2. In an animal trap, a base, an outer jaw at one end of the base positioned substantially perpendicular thereto, a sliding element slidably mounted relative to the base, an inner jaw on the sliding element positioned substantially parallel to the outer jaw, a shaft secured to the inner jaw, a guide element loosely receiving the shaft at a distance from the inner jaw, said guide element being connected with the base and a compression spring between said guide element and the inner jaw, said compression spring being coiled around the shaft.

3. In an animal trap, a base, a jaw at one end of the base and projecting at substantially right angles thereto, a sliding element slidably mounted relative to the base, an inner jaw on the sliding element positioned substantially parallel to the outer jaw, the inner jaw being provided with an opening, a trigger comprising an arm having one end extended through said opening and to a position adjacent the outer jaw, the other end of the trigger being hinged to the base and provided with a lever portion positioned substantially parallel to the inner jaw, a shaft secured to the inner jaw and slidably extended through said lever portion and a compression spring coiled around the shaft and received between the inner jaw and said lever portion for urging the inner jaw toward the outer jaw and for urging the trigger into engagement with the inner jaw.

Signed this 2nd day of March, 1927, in the county of Woodbury and State of Iowa.

BUEL COUCH.